US007001632B2

(12) United States Patent
Nauth et al.

(10) Patent No.: US 7,001,632 B2
(45) Date of Patent: Feb. 21, 2006

(54) ANTI-LISTERIA COMPOSITIONS FOR USE IN FOOD PRODUCTS

(75) Inventors: Kaiser Rajinder Nauth, Wheeling, IL (US); Zuoxing Zheng, Palatine, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 512 days.

(21) Appl. No.: 10/378,329

(22) Filed: Mar. 3, 2003

(65) Prior Publication Data

US 2004/0175473 A1 Sep. 9, 2004

(51) Int. Cl.
*A23B 4/20* (2006.01)
*A23L 3/3463* (2006.01)
*B65D 81/28* (2006.01)

(52) U.S. Cl. ....................... 426/326; 426/335; 426/332

(58) Field of Classification Search ................ 426/321, 426/326, 335, 332, 310; 424/114, 780
See application file for complete search history.

(56) References Cited

U.S. PATENT DOCUMENTS 4,310,657 A 1/1982 Serres, Jr.
4,380,554 A 4/1983 Serres, Jr.
4,559,234 A 12/1985 Rubin et al.
4,810,508 A 3/1989 Dell'Acqua et al.
4,874,704 A 10/1989 Boudreaux et al.
4,883,673 A 11/1989 Gonzalez
4,929,445 A 5/1990 Vandenbergh et al.
5,015,487 A 5/1991 Collison et al.
5,043,174 A 8/1991 Lindner
5,043,176 A 8/1991 Bycroft et al.
5,082,975 A 1/1992 Todd, Jr. et al.
5,085,873 A 2/1992 Degre
5,132,252 A 7/1992 Shiraiwa et al.
5,170,611 A 12/1992 Buchko et al.
5,186,962 A 2/1993 Hutkins et al.
5,192,570 A 3/1993 Bender et al.
5,205,110 A 4/1993 Buchko
5,230,915 A 7/1993 Shahidi et al.
5,268,185 A 12/1993 Bender et al.
5,286,506 A 2/1994 Millis et al.
5,425,956 A 6/1995 Shahidi et al.
5,443,852 A 8/1995 Shahidi et al.
5,451,369 A 9/1995 Daeschel et al.
5,455,038 A 10/1995 Barney et al.
5,458,876 A 10/1995 Monticello
5,573,797 A 11/1996 Wilhoit
5,573,800 A 11/1996 Wilhoit
5,573,801 A 11/1996 Wilhoit
5,682,729 A 11/1997 Buchko
5,895,680 A * 4/1999 Cirigliano et al. .......... 426/326
5,981,473 A * 11/1999 Barefoot et al. ............... 514/2
6,010,726 A 1/2000 Evans et al.
6,037,140 A 3/2000 Carles et al.
6,039,992 A 3/2000 Compadre et al.
6,054,163 A 4/2000 Wettenhall et al.
6,110,509 A 8/2000 Nauth et al.
6,113,954 A 9/2000 Nauth et al.
6,136,351 A 10/2000 Nauth et al.
6,149,952 A 11/2000 Horan
6,150,139 A 11/2000 Mollet et al.
6,242,017 B1 6/2001 Nauth et al.
6,287,617 B1 9/2001 Bender et al.
6,403,134 B1 * 6/2002 Nayyar et al. .............. 426/335
6,433,053 B1 * 8/2002 Kasturi et al. .............. 524/277
6,620,446 B1 * 9/2003 King et al. ................. 426/335
6,780,447 B1 * 8/2004 Raczek ........................ 426/61

FOREIGN PATENT DOCUMENTS

DE 4229707 * 3/1994
EP 0466244 2/1991
EP 1 369 045 * 12/2003
WO 97/29645 * 9/1997

OTHER PUBLICATIONS

Barnes et al., Morbidity and Mortality Weekly Report, vol. 38:267-268 (1989).
Buchanan et al., Applied and Environmental Microbiology, vol. 55:599-603 (1989).
Bailey et al., Journal of Food Protection, vol. 52:148-150 (1989).
Gitter, The Veterinary Record, vol. 99:336 (1976).
Farber et al., Canadian Institute of Food Science Technology, vol. 21:430-434 (1988).
Jydegaard et al., Society for Applied Microbiology, vol. 31:68-72 (2000).
Motlagh et al., Journal of Food Protection, vol. 55:337-343 (1992).
Bhunia et al., Journal of Applied Bacteriology, vol. 70:25-33 (1991).
Ming et al., Journal of Food Science, vol. 62:413-415 (1997).
Fang et al., Journal of Food Protection, vol. 57:479-484 (1994).
Fowler et al., Society for Applied Bacteriology Technical Series, vol. 8:90-105 (1975).
Gailani et al., Journal of Food Protection, vol. 47:428-433 (1984).
Raccach, Journal of Food Safety, vol. 6:141-170 (1984).
Payne et al., Journal of Food Protection, vol. 52:151-153 (1989).

* cited by examiner

*Primary Examiner*—Keith Hendricks
(74) *Attorney, Agent, or Firm*—Fitch, Even, Tabin & Flannery

(57) ABSTRACT

Improved antimicrobial compositions are provided. The improved antimicrobial compositions of this invention contain a dairy-allergen-free nisin derived from whey, pediocin, an edible organic acid (e.g., lactic acid), and a phenol-based antioxidant (e.g., tertiary butylhydroquinone). Such improved antimicrobial compositions are useful in imparting improved antibacterial activity to food products, especially products having a relatively high water activity including cooked or uncooked meat products, cheeses, and the like.

21 Claims, 2 Drawing Sheets

ANTI-LISTERIA COMPOSITIONS FOR USE IN FOOD PRODUCTS

FIELD OF THE INVENTION

This invention generally relates to anti-*Listeria* compositions for use within food products. The anti-*Listeria* compositions provided herein comprise nisin derived from whey, pediocin, lactic acid, and tertiary butylhydroquinone (TBHQ) and are especially useful in food products which are susceptible to detrimental bacterial or other microbiological action.

BACKGROUND OF THE INVENTION

The presence of food spoilage organisms and pathogens in foods is a major concern to the food processing industry, government regulatory agencies, and consumers. Elimination of pathogenic contamination has been the subject of a great deal of study in the food industry and in the scientific community. In particular, elimination of *Listeria monocytogenes* has been the focus of numerous studies and articles. See, e.g., Barnes et al., *Morbid. Mortal. Weekly Rep.* 38:267–268 (1989). Buchanan et al, *Appl Environ. Microbiol.* 55:599–603 (1989); Bailey et al., *J. Food Prot.* 52:148–150 (1989); Gitter, *Vet. Res.* 99:336 (1976); and Farber et al., *Can. Inst. Food Sci. Technol. J.* 21:430–434 (1988).

Numerous attempts have been made to increase the microbiological stability of food products, especially for meat, poultry, and seafood products. Although far from exhausting, the following is provided to provide an overview of the art with regard to these efforts.

U.S. Pat. No. 5,043,174 used a liquid smoke derivative to inhibit *Listeria*. Hop acids and hop acid derivatives in various forms have been used to inhibit *Listeria*. See, e.g., U.S. Pat. Nos. 5,082,975, 5,286,506, and 5,455,038.

U.S. Pat. Nos. 5,573,800 and 5,573,801 provide an antimicrobial solution that includes nisin and/or pediocin along with a chelator, and processes for using the antimicrobial solution to treat the surface of foods by applying the composition to the entire surface of the food. U.S. Pat. Nos. 6,110,509, 6,113,954, 6,136,351, and 6,242,017 used nisin-containing whey to inhibit various microorganisms in food products. See also, Jydegaard et al., *Soc. Appl. Microbiology,* 31, 68–72 (2000); Motlagh et al., *J. Food Protection,* 55, 337–343 (1992); Bhunia et al., *J. Appl. Bacteriology,* 70, 25–33 (1991). Ming et al., *J. Food Sci.,* 62, 413–415 (1997) reported applying nisin and pediocin "powders" to food packaging materials to inhibit *Listeria* in meat and poultry products. Fang et al., J. Food Protection, 57, 479–484 (1994) employed nisin with a carbon dioxide atmosphere packaging for inhibition of microorganisms in pork products. Ray, "Pediocin(s) of *Pediococcus Acidilactici* as a Food Biopresevative," in *Food Biopreservatives of Microbial Origin*, Chapter 10 (1992), provides a review of the use of antimicrobial compositions based on pediocins.

U.S. Pat. No. 5,015,487 provides a method using a lanthionine bacteriocin to treat the surface of meat products to inhibit contamination. U.S. Pat. No. 5,085,873 provides a process for the treatment of a hydrated food product by depositing an antimicrobial mixture containing lactoperoxidase, a thiocyanate, and an oxygen donor on the surface of the hydrated food product. U.S. Pat. No. 6,039,992 provides a method using quaternary ammonium compounds for inhibiting a broad spectrum of microorganisms (including *Listeria*) on food products.

Antioxidants (e.g., butylated hydroxyanisole (BHA), butylated hydroxytoluene (BHT), tertiary butylhydroquinone (TBHQ), and propyl gallate) have been used to provide antimicrobial activity in food products. See, e.g., Gailani et al., *J. Food Protection,* 47, 428–433 (1984); Raccach, *J. Food Safety,* 6, 141–170 (1984); Payne et al., *J. Food Protection,* 52, 151–153 (1989).

Although the art has provided improved protection of food products against microorganisms, there remains a need for even further improvements. Thus, it would be desirable to provide improved compositions and methods for imparting antibacterial and/or antimicrobial activity, especially *Listeria*-resisting activity, to food supplies for commercial channels of trade. It would also be desirable to provide *Listeria* protection in a simplified manner, especially for use in meat products such as wieners and sliced meat products. It would also be desirable to provide antimicrobial compositions which have more effective antimicrobial activities and especially more effective anti-*Listeria* activities for use in food products. The present invention provides such methods and compositions.

SUMMARY OF THE INVENTION

In accordance with the present invention, improved antimicrobial compositions are provided. The improved antimicrobial compositions of this invention contain a nisin derived from whey, pediocin, an edible organic acid (e.g., lactic acid), and a phenol-based antioxidant (e.g., tertiary butylhydroquinone). Such improved antimicrobial compositions are useful in imparting improved antibacterial activity to food products, especially products having a relatively high water activity including cooked or uncooked meat products, cheeses, and the like. Food products containing such improved antimicrobial compositions have *Listeria* protection to impart an extra level of protection to food supplies incorporating the improved antimicrobial compositions. The improved antimicrobial compositions are especially useful for providing anti-*Listeria* protection for cooked meat products such as wieners and sliced meat products such as luncheon meats.

In a preferred embodiment, the present invention provides an aqueous antimicrobial composition comprising nisin derived from whey, pediocin derived from whey, an edible organic acid, and a phenol-based antioxidant; wherein the composition has a nisin activity of at least about 900 IU/ml, a pediocin activity equivalent to at least about a 16 mm inhibition zone, a phenol-based antioxidant concentration at least about 0.5 percent, a pH of about 3 to about 5, and is essentially free of dairy allergens.

In another preferred embodiment, the present invention provides an aqueous antimicrobial composition comprising nisin derived from whey, pediocin derived from whey, an edible organic acid, and a phenol-based antioxidant, wherein the composition has a nisin activity of about 1000 about 3000 IU/ml, a pediocin activity equivalent to at least about a 20 mm inhibition zone, a phenol-based antioxidant concentration of about 0.75 to about 1.5 percent, a pH of about 3.3 to about 3.5, and is essentially free of dairy allergens.

The present invention also provides a method for inhibiting microbial growth in a food product, said method comprising applying an effective amount of an antimicrobial composition to the food product and sealing the food product and the antimicrobial composition in a package, wherein the antimicrobial composition comprises an aqueous antimicrobial composition comprising nisin derived from whey, pediocin derived from whey, an edible organic acid, and a phenol-based antioxidant; wherein the composition has a nisin activity of at least about 900 IU/ml, a pediocin activity equivalent to at least about a 16 mm inhibition zone, a phenol-based antioxidant concentration at least about 0.5 percent, a pH of about 3 to about 5, and is essentially free of dairy allergens. Preferably the edible organic acid is lactic acid and the phenol-based antioxidant is tertiary butylhydroquinone (TBHQ).

DETAILED DESCRIPTION

Figure 1:
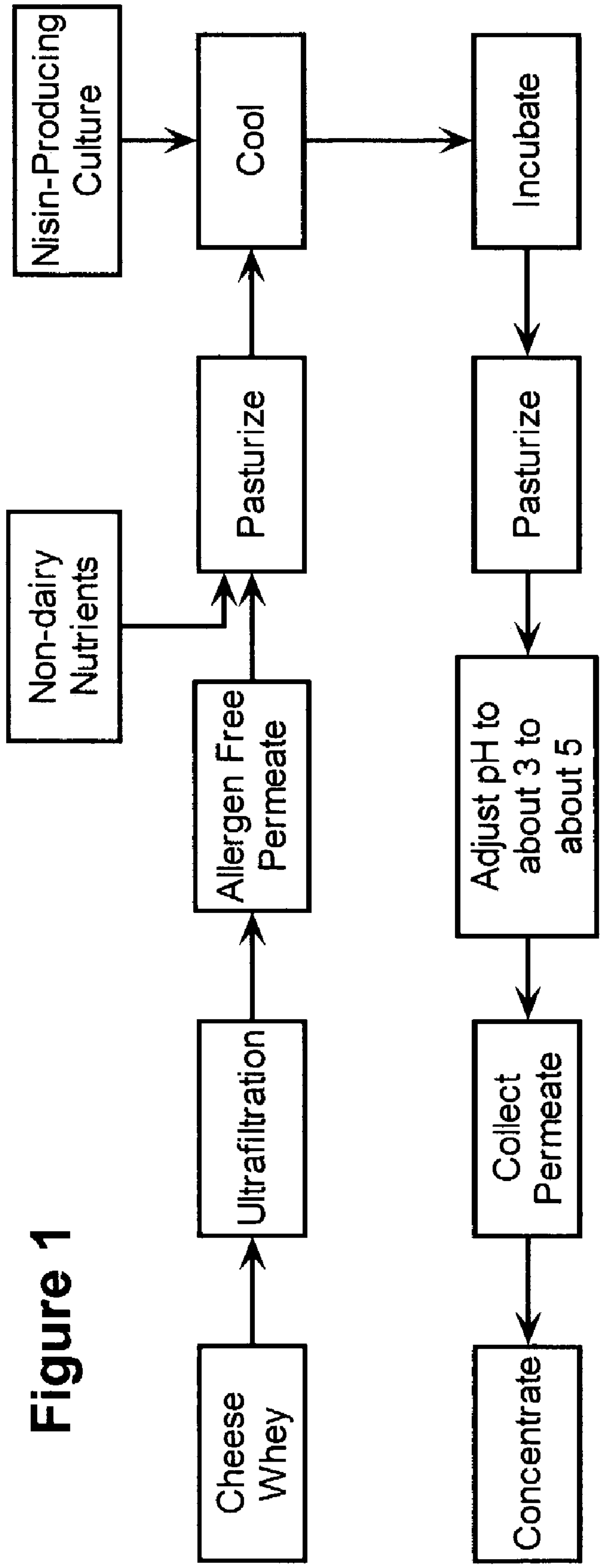
FIG. 1 is a flow chart illustrating the preparation of a dairy-allergen-free nisin derived from whey which is useful in this invention.

Food products which can be enhanced in terms of protection from *Listeria* development according to the invention are those having significant water levels which enhance the hosting of bacteria including those from the *Listeria* species, including *Listeria monocytogenes*. Food products which are especially benefitted by the invention are meats (i.e., meat, poultry, seafood, and the like), processed meat products, sliced meat products, and cheeses. This invention is especially directed towards providing antimicrobial protection for sausage products, wieners or hot dogs, luncheon meats, poultry, seafood, soft cheeses, pate, and the like. Antibacterial and anti-*Listeria* attributes can be imparted to these by use of the antimicrobial compositions according to the invention.

The antimicrobial composition of this invention comprises nisin derived from whey, pediocin derived from whey, an edible organic acid, and a phenol-based antioxidant; wherein the composition has a nisin activity of at least about 900 IU/ml, a pediocin activity equivalent to at least about a 16 mm inhibition zone, a phenol-based antioxidant concentration at least about 0.5 percent, a pH of about 3 to about 5, and is essentially free of dairy allergens.

Both the nisin- and pediocin-containing components are derived from wheys obtained from conventional cheese-making processes. Suitable cheese wheys can be obtained from almost any type of cheese-making process which forms a cheese whey. Suitable cheeses from which the cheese whey may be obtained include, for example, ricotta, mozzarella, Swiss, Parmesan, cheddar, and the like. Such starting cheese whey will, of course, potentially contain significant levels of dairy allergens. The introduction of such dairy allergens into non-dairy food products potentially would, of course, cause allergenic reactions in some individuals if they were to consume such products. Thus, the introduction of such dairy allergens in such non-dairy products should be avoided. Thus, both the nisin- and pediocin-containing components, as well as all other ingredients added to the antimicrobial compositions of this invention, should be essentially free of dairy allergens if the antimicrobial composition is to be used for non-dairy food products. For purposes of this invention, "essentially free of dairy allergens" is intended to mean less than about 5 ppm, more preferably less than about 2.5 ppm, and most preferably less than about 1 ppm as measured using the Neogen Veratox™ milk ELISA test kits and procedures (Neogen Corporation, Lansing, Mich.).

The cheese whey used to prepare the nisin- and pediocin-containing components is, therefore, preferably treated to remove dairy allergens using ultrafiltration techniques with a filtration cut off of less than about 12 k Dalton molecular weight, preferably less than about 10 k Dalton molecular weight. Generally such techniques will reduce the level of dairy allergens in the cheese whey to below detection limits of the Neogen Veratox™ milk ELISA method to provide cheese whey permeates which are essentially dairy allergen free. Of course, if the antimicrobial solutions of this invention are to be used to treat dairy products (e.g., cheeses), such allergen-free materials are not needed.

Figure 2:
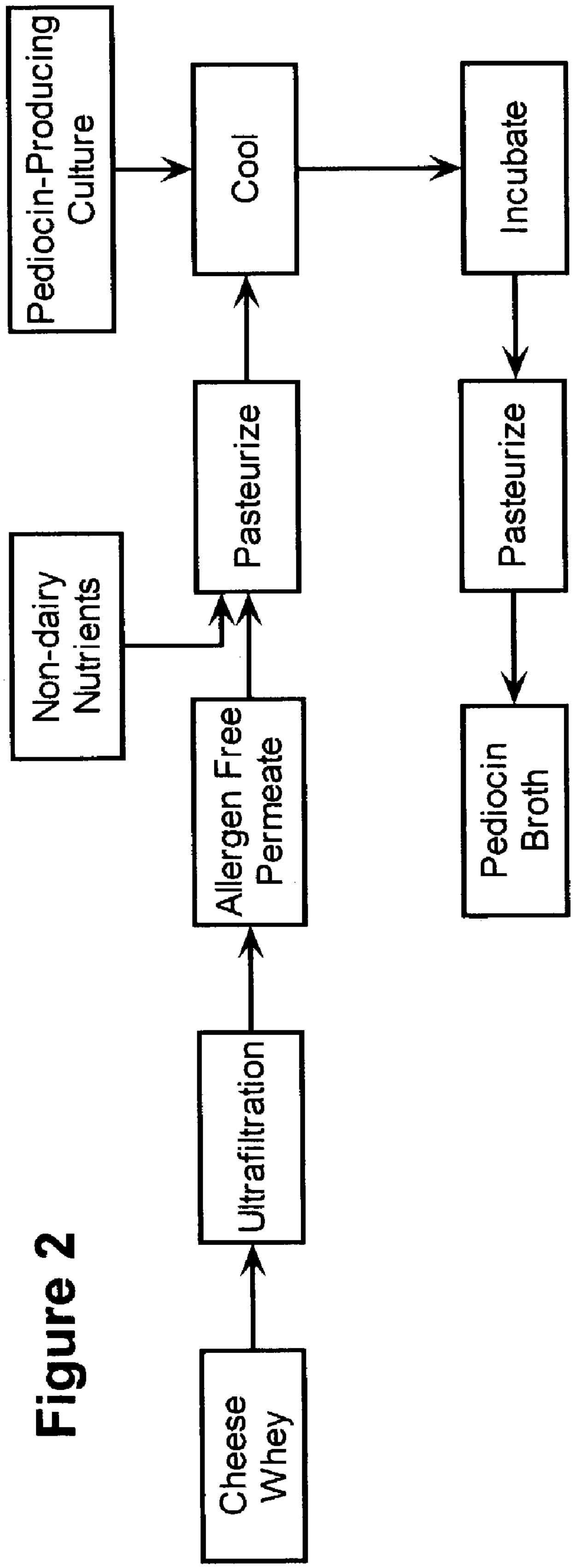
FIG. 2 is a flow chart illustrating the preparation of a pediocin useful in this invention.

FIGS. 1 and 2 illustrate procedures for producing both the nisin- and the pediocin-containing components, respectively, which are essentially dairy allergen free. Of course, components used in these procedures after the ultrafiltration step should be essentially dairy allergen free (i.e., non-dairy derived) to prevent reintroduction of dairy allergens. The nisin- and pediocin-containing components are preferably derived from cheese whey (each may be prepared from the same cheese whey or types of cheese whey or from different cheese wheys or types of cheese whey). The cheese whey is subjected to conventional ultrafiltration procedures so as to effectively remove dairy allergens and to produce the allergen free permeate. Generally, a molecular weight cut off of less than about 12 k Dalton molecular weight, preferably less than about 10 k Dalton molecular weight, is used in the ultrafiltration process. The resulting essentially allergen free cheese whey may then be treated with conventional techniques using appropriate cultures to obtain the nisin- and pediocin-containing components.

As shown in FIG. 1, the allergen free permeate is combined with suitable non-diary nutrients (e.g., peptone, yeast extract, and the like) to provide a suitable growth medium for the later added nisin producing cultures.

The nutrient-containing allergen free permeate is then pasteurized (generally at about 165 to about 195° F. for about 30 to about 45 minutes) and then cooled to about 65 to about 100° F. before inoculating with a nisin producing culture (generally at about $10^3$ to about $10^7$ cfu/ml). The inoculated medium is then incubated at about 65 to about 100° F. for about 8 to about 24 hours to allow growth the nisin producing cultures. The pH, if necessary, is then adjusted to about 3.5 to about 5.0 with an edible organic acid (e.g., lactic acid) and then held at about 65 to about 100° F. for about 1 to about 16 hours. The resulting mixture is then pasteurized (generally at about 165 to about 195° F. for about 20 to about 45 minutes); the pasteurization step will also inactivate any remaining culture. The fermented broth, which contains nisin, is then collected. Preferably, solids are effectively removed from the broth or permeate by, for example, filtration, centrifugation, or the like. Generally, it is preferred that the permeate is then concentrated in order to increase the nisin activity or concentration of the nisin-containing material. Conventional techniques can be used for this concentration step and can include, for example, flash evaporation, vacuum drying, freeze drying, and the like. Generally, the permeated is concentrated by a factor of about 2× to about 8×, and more preferably to about 3×, in order to provide a nisin activity of about 1500 to about 3000 IU/ml. This concentration preparation can be stored at refrigeration temperatures for several months without significant loss of activity.

As shown in FIG. 2, the allergen free permeate is combined with suitable non-diary nutrients (e.g., glucose, peptone, yeast extract, manganese sulfate, and the like) to provide a suitable growth medium for the later added pediocin producing cultures (i.e., Pediococci). The nutrient-containing allergen free permeate, preferably with the pH adjusted to about 6 to about 6.7, is then pasteurized (generally at about 165 to about 195° F. for about 30 to about 45 minutes) and then cooled to about 60 to about 110° F. before inoculating with a pediocin producing culture (generally at about $10^3$ to about $10^7$ cfu/ml). The inoculated medium is then incubated at about 60 to about 100° F. for about 6 to about 18 hours to a pH of about 4.6 to about 5.5 to allow growth of the pediocin producing cultures. The resulting mixture is then pasteurized (generally at about 165 to about 195° F. for about 20 to about 45 minutes); the pasteurization step will also inactivate any remaining culture. The fermented broth, which contains pediocin, is then collected. Preferably, solids are effectively removed using, for example, filtration, centrifugation, or the like. Generally, the pediocin activity is sufficiently high so that concentration is not required. The pediocin can be used as a broth (in which case additional water may not be needed to form the ultimate antimicrobial solution) or concentrate (in which case additional water may be added to form the ultimate antimicrobial solution). Generally, the pediocin activity (before any optional concentration step) will be equivalent or higher than an inhibition zone of about 16 mm on an indicator lawn (brain heart infusion (BHI) agar plate seeded with $10^5$ to $10^6$ indicator cells of *Listeria monocytogenes* and incubated overnight at about 32 to about 35° F.)). More preferably, the pediocin activity (before any optional concentration step) will be equivalent to an inhibition zone of at least about 18 mm, and even more preferably about 18 to about 22 mm, on the indicator lawn.

Suitable edible organic acids include, for example, lactic acid, acetic acid, propionic acid, citric acid, and the like, as well as mixtures thereof. The preferred edible organic acid is lactic acid. The edible organic acid, especially lactic acid, may be added to the composition via one of the other ingredients (e.g., included in the nisin derived from whey component and/or the pediocin derived from whey component) or added as a separate component. Especially, when lactic acid is the edible organic acid, it is generally preferred that the at least one of other ingredients contain the edible organic acid and that it also be added as a separate component. The amount of edible organic acid (whether included in another component and/or added as a separate component) should be sufficient to achieve a pH of about 3 to about 5, and more preferably of about 3.3 to about 3.5, in the antimicrobial composition.

Suitable phenol-based antioxidants include, for example, butylated hydroxyanisole (BHA), butylated hydroxytoluene (BHT), tertiary butylhydroquinone (TBHQ). The preferred phenol-based antioxidant is tertiary butylhydroquinone. The amount of the phenol-based antioxidant in the antimicrobial solution should about 0.5 to about 1.5 percent, and more preferably about 0.75 to about 1 percent.

The antimicrobial composition of the present invention is aqueous based. Water may be obtained by the addition of one or more of the active ingredients (e.g., from the nisin-containing broth and/or the pediocin-containing broth) and/or may be added as a separate component.

Of course, other functional ingredients can be incorporated into the antimicrobial solution if desired to improve flow characteristics, wetting ability, adherence to the food surfaces, and the like so long as they are soluble in the antimicrobial solution and do not adversely affect either the antimicrobial activity of the antimicrobial solution or the organoleptic properties of the resulting food products. Of course, any such functional ingredients should not introduce dairy allergens into the antimicrobial solution.

Any suitable manner of applying the improved antimicrobial compositions of this invention to the food product can be used. Examples of such methods include mixing the antimicrobial composition with the food product, injecting the antimicrobial composition into the food product, spreading the antimicrobial composition onto the outer surfaces of the food product, dipping the food product into the antimicrobial composition, spraying the food product with the antimicrobial composition, including the antimicrobial composition in a package with the food product such that the antimicrobial composition effectively covers the outer surfaces of the food product, and the like.

With regard to sliced meats, the antimicrobial compositions can be sprayed onto the food product as it is being sliced, thereby providing protection for the food product and reducing the risk of contamination of the slicer and its blade. Alternatively, the food product may be sliced in the presence of a fog or mist of the antimicrobial composition to provide the desired degree of protection. Using an antimicrobial fog during the slicing process should allow uniform delivery of the antimicrobial solution to the surface of the sliced products. Moreover, enclosing the cutting blade assembly and applying the antimicrobial fog within that enclosure should reduce soiling of the cutting blade. Moreover, such an enclosure in combination with the antimicrobial fog will help maintain a constant listericidal environment.

The antimicrobial solutions are this invention as especially adapted for use in a combination treatment scheme involving thermal surface treatment and antimicrobial treatment as described in copending application Ser. No. 10/378,247, filed on the same date as the present application and entitled "Method for Controlling Microbial Contamination Of a Vacuum-Sealed Food Product", which is hereby incorporated by reference. This combination treatment provides a method for controlling contamination of vacuum-sealed food products involving (1) a thermal surface treatment and (2) application of one or more antimicrobial agents to the surface of food products, whereby the thermal surface treatment and the application of the antimicrobial solution are, in combination, effective for killing or inactivating essentially all pathogenic contamination in the vacuum-sealed food product. The present methods can easily be incorporated into a vacuum packaging line such as a web packaging system wherein the food product is packaged and sealed between upper and lower webs.

The following examples illustrate the efficacy of the present invention and of the present compositions and are not intended to limit the invention as claimed. Unless noted otherwise, all percentages are by weight. All patents, publications, and the like cited herein are incorporated by reference.

EXAMPLE 1

This example illustrates the preparation of nisin derived from whey for use in the present example. Cheese whey was subjected to ultrafiltration using a 10,000 Dalton molecular weight cut off filter at about 120° F. in order to obtain a permeate essentially free of dairy allergens. The absence of dairy allergens was confirmed using Neogen Veratox™ milk ELISA. After adding non-dairy nutrients (i.e., about 1 percent peptone (Difico protease) and about 0.5 percent yeast extract), the permeate was pasteurized at about 185° F. for 45 minutes and then cooled to about 86° F. The cooled and pasteurized permeate was inoculated with about $2\times10^6$ cfu/ml of a nisin-producing culture. The inoculated permeate was incubated at about 86° F. for about 10 hours at a pH of about 5.5 followed by a pH drop to about 4.6 for about six hours. The nisin activity was about 900 IU/ml (Fowler et al., *Tech. Series Soc. Bacteriol.,* 8, 91–105 (1975)). The pH was adjusted to about 3.5 with lactic acid and held overnight at about 86° F. to obtain a nisin activity of about 2000 IU/ml. After pasteurization (about 185° F. for about 30 minutes), the resulting broth was centrifuged at about 16,000 rpm and decanted to obtain a clarified nisin-containing solution with a nisin activity of about 1530 IU/ml and a pH of about 3.5. A nisin-containing preparation with a nisin activity of about 4000 IU/ml was obtained by concentrating the solution by about 3× using flash evaporation. The nisin-containing broth was stable at refrigeration conditions for several months.

EXAMPLE 2

This example illustrates the preparation of pediocin for use in the present example. Cheese whey was subjected to ultrafiltration using a 10,000 Dalton molecular weight cut off filter at about 120° F. in order to obtain a permeate essentially free of dairy allergens. The absence of dairy allergens was confirmed using Neogen Veratox™ milk ELISA assay. After adding non-dairy nutrients (i.e., about 1 percent glucose, about 0.5 percent peptone (Difico protease), about 0.5 percent yeast extract, about 0.014 percent manganese sulfate) and adjusting the pH to about 6.5 by adding base (i.e., NaOH or KOH), the permeate was pasteurized at about 185° F. for 45 minutes and then cooled to about 98° F. The cooled and pasteurized permeate was inoculated with about $1\times10^6$ cfu/ml of a pediocin-producing strain of Pediococcus (i.e., *Pediococcus acidilactici* or *Pediococcus pentosaceus*). The inoculated permeate was incubated at about 86° F. for about 18 hours to a pH of about 4.8. The resulting broth was centrifuged at refrigeration temperatures at about 16,000 rpm and then decanted to obtain a clarified pediocin broth. The broth had a pediocin activity equivalent to a 20 mm inhibition zone using a well assay with a brain heart infusion (BHI) agar plate seeded with about $10^5$ to about $10^6$ *Listeria monocytogenes* indicator cells. Test samples (about 40 μl) were placed in the wells. After incubation overnight at about 350° F., the sizes of the zones of inhibition were measured.

EXAMPLE 3

Antimicrobial solutions were prepared by mixing the nisin-containing broth of Example 1 and the pediocin-containing broth of Example 2 and adding TBHQ and lactic acid at the desired levels. Specifically, an antimicrobial solution containing the nisin-containing broth and the pediocin-containing broth (1:1 by volume), about 1 percent TBHQ, and about 0.5 percent lactic acid was prepared (pH about 4.2) and evaluated on sliced bologna, turkey, and ham inoculated with about $10^4$ CFU 5-strain mixture of *Listeria monocytogenes*. The meat slices were first dipped into the antimicrobial solution for about 60 seconds. One slice of the treated samples was inoculated with the 5-strain mixture at four spots; a second slice of the same meat sample was then placed on top such that the inoculate was sandwiched between the slices, and the inoculated slices were vacuum packaged. Samples were stored for about 24 hours at refrigeration temperatures and then analyzed for the presence of *L. monocytogenes* by direct plating onto plate count agar and MOX (Modified Oxford Medium) plates. Colonies producing a black precipitate on the plates were considered positive for *L. monocytogenes*. Additionally, a modified USDA cultural method was performed for some samples. More details of these test methods can be found in Microbiology Laboratory Guidebook, USDA, 3rd Ed., Chapter 8, Revision 3 (1998), which is hereby incorporated by reference. Controls were treated essentially the same expect that they were not dipped in the antimicrobial solution. The following results were obtained.

| | Bologna | | Turkey | | Ham | |
|---|---|---|---|---|---|---|
| Sample | TPC | MOX | TPC | MOX | TPC | MOX |
| Control 1 | 6200 | 2800 | 3600 | 3740 | 8400 | 7200 |
| Control 2 | 6800 | 11000 | 6400 | 7800 | 5800 | 3800 |
| Control 3 | 10200 | 6600 | 9000 | 8000 | 8000 | 1920 |
| Inventive 1 | 200 | 380 | 220 | 320 | 260 | 400 |
| Inventive 2 | 60 | 140 | 60 | 180 | 260 | 320 |
| Inventive 3 | 40 | 80 | <20 | <20 | 80 | 180 |

Values in the above table are reported in CFU per package (two slices). These results show the effectiveness of the antimicrobial solution in inhibiting *Listeria*.

EXAMPLE 4

Evaluation similar to those reported in Example 3 were carried out using an antimicrobial solution containing the nisin-containing broth of Example 1 and the pediocin-containing broth of Example 2 (3:1 by volume), about 1 percent TBHQ, and about 0.5 percent lactic acid (pH about 3.5). Again, bologna, turkey, and ham slices treated with the antimicrobial solution were evaluated using inoculation with about $10^4$ CFU 5-strain mixture of *Listeria monocytogenes* in the same manner of Example 3. The following results were obtained.

| | Bologna | | Turkey | | Ham | |
|---|---|---|---|---|---|---|
| Sample | TPC | MOX | TPC | MOX | TPC | MOX |
| Control | 8400 | 12000 | 9600 | 13000 | 40000 | 14000 |
| Inventive 1 | <20 | <20 | <20 | <20 | <20 | <20 |
| Inventive 2 | <20 | <20 | <20 | <20 | <20 | <20 |
| Inventive 3 | <20 | <20 | <20 | <20 | <20 | <20 |

Values in the above table are reported in CFU per package (two slices). Additionally, USDA enrichment tests on the three inventive samples were negative. These results show the effectiveness of the antimicrobial solution in inhibiting *Listeria*.

EXAMPLE 5

Wieners were treated in a manner similar to that described in Example 3 with various solutions (as indicated in the table below) except both the wieners and the packaging material were treated with the test solutions as follows: wieners were dipped in the test solution for about 60 seconds; the insides of the packages were also rinsed with the test solutions and drip dried. After treatment, the wieners were inoculated with *Listeria monocytogens* (about 2500 cells per wiener) and then sealed in the packages. No additional lactic acid addition was required; lactic acid was introduced via the nisin-containing whey component. After inoculation and storage at refrigeration temperatures for various times, the *Listeria* level (measured as CFU/wiener) was determined. The following results were obtained.

| Sample | Time (days) | | | |
|---|---|---|---|---|
| | 3 | 7 | 14 | 21 |
| Control | 2000 | 1950 | 1600 | 2200 |
| Nisin-containing whey | 100 | 150 | 100 | 70 |
| Nisin-containing whey + 0.8% TBHQ | 70 | 40 | 15 | 0 |
| Pediocin | 1200 | 510 | 600 | 370 |
| Pediocin + 0.8% TBHQ | 1100 | 200 | 0 | 0 |
| Nisin-containing whey + Pediocin (1:1 by volume) | 1000 | 500 | 1500 | 300 |
| Nisin-containing whey + Pediocin (1:1 by volume) + 0.8% TBHQ | 10 | 30 | 0 | 0 |

As demonstrated in the table, the inventive sample (i.e., Nisin-containing whey+Pediocin (1:1 by volume)+0.8% TBHQ) shows consistent and effective inhibition.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. An aqueous antimicrobial composition comprising nisin derived from whey, pediocin, an edible organic acid, and a phenol-based antioxidant; wherein the composition has a nisin activity of at least about 900 IU/ml, a pediocin activity equivalent to at least about a 16 mm inhibition zone, at least about 0.5 percent of the phenol-based antioxidant, and a pH of about 3 to about 5.

2. The antimicrobial composition of claim 1, wherein the antimicrobial composition is essentially free of dairy allergens.

3. The antimicrobial composition of claim 2, wherein the nisin activity is about 1000 to about 3000 IU/ml, the pediocin activity is equivalent to at least about a 18 mm inhibition zone, the phenol-based antioxidant is about 0.75 to about 1.5 percent, and the pH is about 3.3 to about 3.5.

4. The antimicrobial composition of claim 2, wherein the nisin derived from whey is prepared by a method comprising treating a first cheese whey by ultrafilitration to obtain a first cheese whey permeate that is essentially free of dairy allergens, treating the first cheese whey permeate with a nisin-producing culture to obtain the nisin derived from whey, and collecting the nisin derived from whey, wherein the nisin derived from whey is essentially free of dairy allergens.

5. The antimicrobial composition of claim 3, wherein the nisin derived from whey is prepared by a method comprising treating a first cheese whey by ultrafilitration to obtain a first cheese whey permeate that is essentially free of dairy allergens, treating the first cheese whey permeate with a nisin-producing culture to obtain the nisin derived from whey, and collecting the nisin derived from whey, wherein the nisin derived from whey is essentially free of dairy allergens.

6. The antimicrobial composition of claim 2, wherein the pediocin is prepared by a method comprising treating a second cheese whey by ultrafiltration to obtain a second cheese whey permeate that is essentially free of dairy allergens, treating the second cheese whey permeate with a pediocin-producing culture to obtain the pediocin, and collecting the pediocin, wherein the pediocin is essentially free of dairy allergens.

7. The antimicrobial composition of claim 3, wherein the pediocin is prepared by a method comprising treating a second cheese whey by ultrafiltration to obtain a second cheese whey permeate that is essentially free of dairy allergens, treating the second cheese whey permeate with a pediocin-producing culture to obtain the pediocin, and collecting the pediocin, wherein the pediocin is essentially free of dairy allergens.

8. The antimicrobial composition of claim 4, wherein the pediocin is prepared by a method comprising treating a second cheese whey by ultrafiltration to obtain a second cheese whey permeate that is essentially free of dairy allergens, treating the second cheese whey permeate with a pediocin-producing culture to obtain the pediocin, and collecting the pediocin, wherein the pediocin is essentially free of dairy allergens.

9. The antimicrobial composition of claim 5, wherein the pediocin is prepared by a method comprising treating a second cheese whey by ultrafiltration to obtain a second cheese whey permeate that is essentially free of dairy allergens, treating the second cheese whey permeate with a pediocin-producing culture to obtain the pediocin, and collecting the pediocin, wherein the pediocin is essentially free of dairy allergens.

10. The antimicrobial composition of claim 1, wherein the edible organic acid is lactic acid, acetic acid, propionic acid, citric acid, or mixtures thereof; and wherein the phenol-based antioxidant is butylated hydroxyanisole, butylated hydroxytoluene, tertiary butylhydroquinone, or mixtures thereof.

11. The antimicrobial composition of claim 2, wherein the edible organic acid is lactic acid, acetic acid, propionic acid, citric acid, or mixtures thereof; and wherein the phenol-based antioxidant is butylated hydroxyanisole, butylated hydroxytoluene, tertiary butylhydroquinone, or mixtures thereof.

12. The antimicrobial composition of claim 3, wherein the edible organic acid is lactic acid, acetic acid, propionic acid, citric acid, or mixtures thereof; and wherein the phenol-based antioxidant is butylated hydroxyanisole, butylated hydroxytoluene, tertiary butylhydroquinone, or mixtures thereof.

13. The antimicrobial composition of claim 5, wherein the edible organic acid is lactic acid and the phenol-based antioxidant is tertiary butylhydroquinone.

14. The antimicrobial composition of claim 7, wherein the edible organic acid is lactic acid and the phenol-based antioxidant is tertiary butylhydroquinone.

15. A method for inhibiting microbial growth in a food product, said method comprising applying an effective amount of an antimicrobial composition to the food product and sealing the food product and the antimicrobial composition in a package, wherein the antimicrobial composition comprises nisin derived from whey, pediocin, an edible organic acid, and a phenol-based antioxidant; and wherein the antimicrobial composition has a nisin activity of at least about 900 IU/ml, a pediocin activity equivalent to at least about a 16 mm inhibition zone, at least about 0.5 percent of the phenol-based antioxidant, a pH of about 3 to about 5, and is essentially free of dairy allergens.

16. The method of claim 15, wherein the food product susceptible to *Listeria monocytogenes* activity.

17. The method of claim 16, wherein the food product is a meat food product.

18. The method of claim 17, wherein the nisin activity of the antimicrobial composition is about 1000 to about 3000 IU/ml, the pediocin activity of the antimicrobial composition is equivalent to at least about a 18 mm inhibition zone, the antimicrobial composition contains about 0.75 to about 1.5 percent of the phenol-based antioxidant, and the pH of the antimicrobial composition is about 3.3 to about 3.5.

19. The method of claim 18, wherein the nisin derived from whey is prepared by a method comprising treating a first cheese whey by ultrafilitration to obtain a first cheese whey permeate that is essentially free of dairy allergens, treating the first cheese whey permeate with a nisin-producing culture to obtain the nisin derived from whey, and collecting the nisin derived from whey, wherein the nisin derived from whey is essentially free of dairy allergens; and wherein the pediocin is prepared by a method comprising treating a second cheese whey by ultrafilitration to obtain a second cheese whey permeate that is essentially free of dairy allergens, treating the second cheese whey permeate with a pediocin-producing culture to obtain the pediocin, and collecting the pediocin, wherein the pediocin is essentially free of dairy allergens.

20. The method of claim 19, wherein the edible organic acid is lactic acid, acetic acid, propionic acid, citric acid, or mixtures thereof; and wherein the phenol-based antioxidant is butylated hydroxyanisole, butylated hydroxytoluene, tertiary butylhydroquinone, or mixtures thereof.

21. The method of claim 19, wherein the edible organic acid is lactic acid and the phenol-based antioxidant is tertiary butylhydroquinone.

* * * * *

UNITED STATES PATENT AND TRADEMARK OFFICE

CERTIFICATE OF CORRECTION

PATENT NO. : 7,001,632 B2
APPLICATION NO. : 10/378329
DATED : February 21, 2006
INVENTOR(S) : Nauth et al.

It is certified that error appears in the above-identified patent and that said Letters Patent is hereby corrected as shown below:

- On Title page, column 2 (U.S. Patent Documents), line 12, after 6,620,446, delete "B1", and insert -- B2 -- .

- On Title page, column 2 (U.S. Patent Documents), line 13, after 6,780,447, delete "B1", and insert -- B2 -- .

Signed and Sealed this

Tenth Day of October, 2006

JON W. DUDAS
*Director of the United States Patent and Trademark Office*